(12) United States Patent
Blattner et al.

(10) Patent No.: US 9,158,309 B2
(45) Date of Patent: Oct. 13, 2015

(54) SANITARY FITTING

(71) Applicant: HANSGROHE SE, Schiltach (DE)

(72) Inventors: Joachim Blattner, Haslach (DE);
Phillipe Grohe, Wolfach (DE); Stefanie Schweickerdt, Horb (DE)

(73) Assignee: Hansgrohe SE, Schiltach (DE)

( * ) Notice: Subject to any disclaimer, the term of this patent is extended or adjusted under 35 U.S.C. 154(b) by 307 days.

(21) Appl. No.: 13/777,133

(22) Filed: Feb. 26, 2013

(65) Prior Publication Data
US 2013/0221115 A1    Aug. 29, 2013

(30) Foreign Application Priority Data

Feb. 28, 2012    (DE) .......................... 10 2012 203 018

(51) Int. Cl.
| | |
|---|---|
| *G05D 23/13* | (2006.01) |
| *E03C 1/02* | (2006.01) |
| *E03C 1/04* | (2006.01) |
| *F16L 5/00* | (2006.01) |

(52) U.S. Cl.
CPC ............ *G05D 23/1306* (2013.01); *E03C 1/021* (2013.01); *E03C 1/0404* (2013.01); *E03C 1/0412* (2013.01); *F16L 5/00* (2013.01); *Y10T 137/6977* (2015.04); *Y10T 137/9464* (2015.04)

(58) Field of Classification Search
CPC ... G05D 23/1306; E03C 1/021; E03C 1/0404; F16L 5/00
USPC .................. 236/12.1, 12.2; 137/801; 239/451
See application file for complete search history.

(56) References Cited

U.S. PATENT DOCUMENTS

| | | | |
|---|---|---|---|
| 3,459,223 A | 8/1969 | Katva | |
| 3,653,407 A | 4/1972 | Katva | |
| 2001/0013553 A1* | 8/2001 | Chamot et al. | ............. 236/12.11 |
| 2008/0105313 A1 | 5/2008 | Gloor et al. | |
| 2008/0277927 A1 | 11/2008 | Mueller et al. | |
| 2011/0100494 A1 | 5/2011 | Wang | |

FOREIGN PATENT DOCUMENTS

| | | |
|---|---|---|
| SU | 33858 A1 | 12/1933 |
| WO | 2008136959 A1 | 11/2008 |

OTHER PUBLICATIONS

"Armaturen und Accessoires," SBZ Jul. 2009, pp. 32-54.
Official action in DE 10 2012 203 018.2, dated Dec. 27, 2012.
Search Report dated Jul. 13, 2013 in EPO application 13156547.5.
Decision on Granting a Patent for Invention, dated Feb. 19, 2015, RU application 2013108742/13(012985), filed Feb. 28, 2013.

* cited by examiner

*Primary Examiner* — Marc Norman
(74) *Attorney, Agent, or Firm* — Duane Morris LLP

(57) ABSTRACT

A sanitary fitting contains a rectilinear or slightly curved tubular outlet body, at one face end of which there is arranged an outlet, out of which the water flows, with the valve open, in a direction extending the direction of the outlet body. At this end of the outlet body there is arranged an actuating element for a valve cartridge arranged axially in the outlet body. At the opposite end of the outlet body there is arranged at a face end an actuating element for a valve cartridge accommodated in the outlet body. The outlet body has a lateral fastening attachment, by way of which the sanitary fitting is fastened to a horizontal or vertical surface and through which the supply lines are led.

21 Claims, 3 Drawing Sheets

SANITARY FITTING

The invention relates to a sanitary fitting.

Sanitary fittings, as are used in bathtubs, shower trays or washbasins, usually have two actuating elements and an outlet. The sanitary fitting can be fastened to the washbasin itself or else to the wall, specifically both to the rear wall and also, for example, to a side wall within an alcove.

In many cases, the operating elements are arranged on the right- and left-hand sides, while the outlet leads out of the sanitary fitting in the middle.

The invention is based on the object of creating a slim, space-saving sanitary fitting that does not need any protrusions.

In order to achieve this object, the invention proposes a sanitary fitting having the features of claim 1. Developments of the invention are the subject matter of dependent claims.

The tubular outlet body uses a very simple basic shape which does not need protrusions. At one end of the outlet body, the outlet is arranged on the face side, so that the outlet body is arranged in a vertical plane instead of the horizontal arrangement that is usual in the prior art. The valve devices arranged in the outlet body are actuated by in each case one actuating element. One of these actuating elements is arranged at the outlet end, and the other at that end of the outlet body that is opposite the outlet end.

The fastening attachment, which is likewise tubular, serves to fasten the outlet body either to the wall, that is to say a vertical surface, or to a washbasin or washstand itself, that is to say on a horizontal surface. The supply lines to the first valve device in the fitting body also lead through the fastening attachment.

When the sanitary fitting is configured for a washbasin, according to the invention it may be provided in a development for the fastening attachment to be in the form of a stand pipe. If it is provided for an exactly vertical arrangement, then its free end side, that is to say the fastening end, extends perpendicularly to the axis of the stand pipe. Of course, the stand pipe can also be arranged in a slightly inclined manner. The actual fastening can take place in one of the usual known ways of fastening.

According to the invention, it may be provided for the fastening end to be formed at that end of the fastening attachment which is opposite the actuating end of the outlet body. This type of configuration is suitable in particular for the arrangement as a sanitary fitting attached to a washstand.

However, it is likewise possible, if the sanitary fitting is intended to be attached to the rear wall, for the fastening end to be formed at that end of the fastening attachment which is opposite the outlet end of the outlet body. In this case, the fastening attachment extends substantially horizontally.

However, it is likewise possible, and is proposed by the invention, if the sanitary fitting is intended to be attached to the rear wall, for the fastening attachment to extend there too in an inclined manner, in particular in a manner inclined from bottom to top.

In particular, it may be provided in a development for the fastening attachment and the outlet body to enclose an acute angle between one another. This makes it possible for the supply lines to need to have for example only a small curvature at the attachment location of the fastening attachment.

According to the invention, it may be provided in a development for the outlet body, which is of course tubular, to be formed in a rectilinear manner, that is to say to have a straight centre axis.

It may likewise be provided for the fastening attachment to be formed in a rectilinear manner.

However, it is likewise possible, and is proposed by the invention, for the outlet body to have a slight curvature so that the respective ends of the tubular outlet body are not arranged in a mutual axial orientation.

The fastening attachment, too, can be provided with a slight curvature.

The curvature can be both a concave curvature and a convex curvature.

The curved configuration of the outlet body can be combined both with a likewise curved configuration and also with a rectilinear configuration of the fastening attachment.

The rectilinear configuration of the outlet body can also be combined with a rectilinear and with a curved configuration of the outlet body.

According to the invention, it may be provided in a development for the axis of the fastening end of the fastening attachment to deviate from the axis of the opposite end of the outlet body by at most 45°, preferably up to 15°.

It may likewise be provided in a development for the axis of the outlet end of the outlet body to deviate from the axis of the actuating end of the outlet body by at most 45°, preferably up to 15°.

In a development of the invention, it may be provided for the actuating element to have a rotatable cap at the actuating end of the outlet body, the outer side of said cap being formed as an approximately cylindrical continuation of the outlet body. This contributes to the slim form of the sanitary fitting. In particular, it may be advantageous in this case for the cap to have a planar end face that extends transversely to the longitudinal axis of the outlet body.

In a further development of the invention, it may be provided for the actuating element to be in the form of a rotatable sleeve at the outlet end of the outlet body, the outer side of said rotatable sleeve being formed preferably as an approximately cylindrical continuation of the outlet body.

In particular, it may be provided for the sleeve of the actuating element to surround the outlet from the sanitary fitting, wherein for example the end face of the sleeve is formed such that the outlet is arranged in a recessed manner within the sleeve.

According to the invention, it may be provided for the valve device of the sanitary fitting, said valve device being actuated by the actuating element at the actuating end, to be a mixing valve which determines the temperature of the water flowing to the outlet. Only one line then leads from this mixing valve to the outlet. The valve device actuated by the actuating element at the outlet end may, in a development, be in the form of a volume regulating valve, it being possible for it optionally to comprise further functions.

However, it is likewise possible, and is within the scope of the invention, for the valve device at the actuating end of the outlet body to be in the form of a volume regulating valve which is responsible both for the cold water and for the hot water and regulates the volumes of both flows of water. In this case, the valve device at the outlet end can be a mixing valve.

Further features, details and advantages of the invention will become apparent from the claims and the abstract, the wording of both of which is incorporated into the content of the description by reference, from the following description of preferred embodiments of the invention and by way of the drawing, in which:

Figures 1, 2:
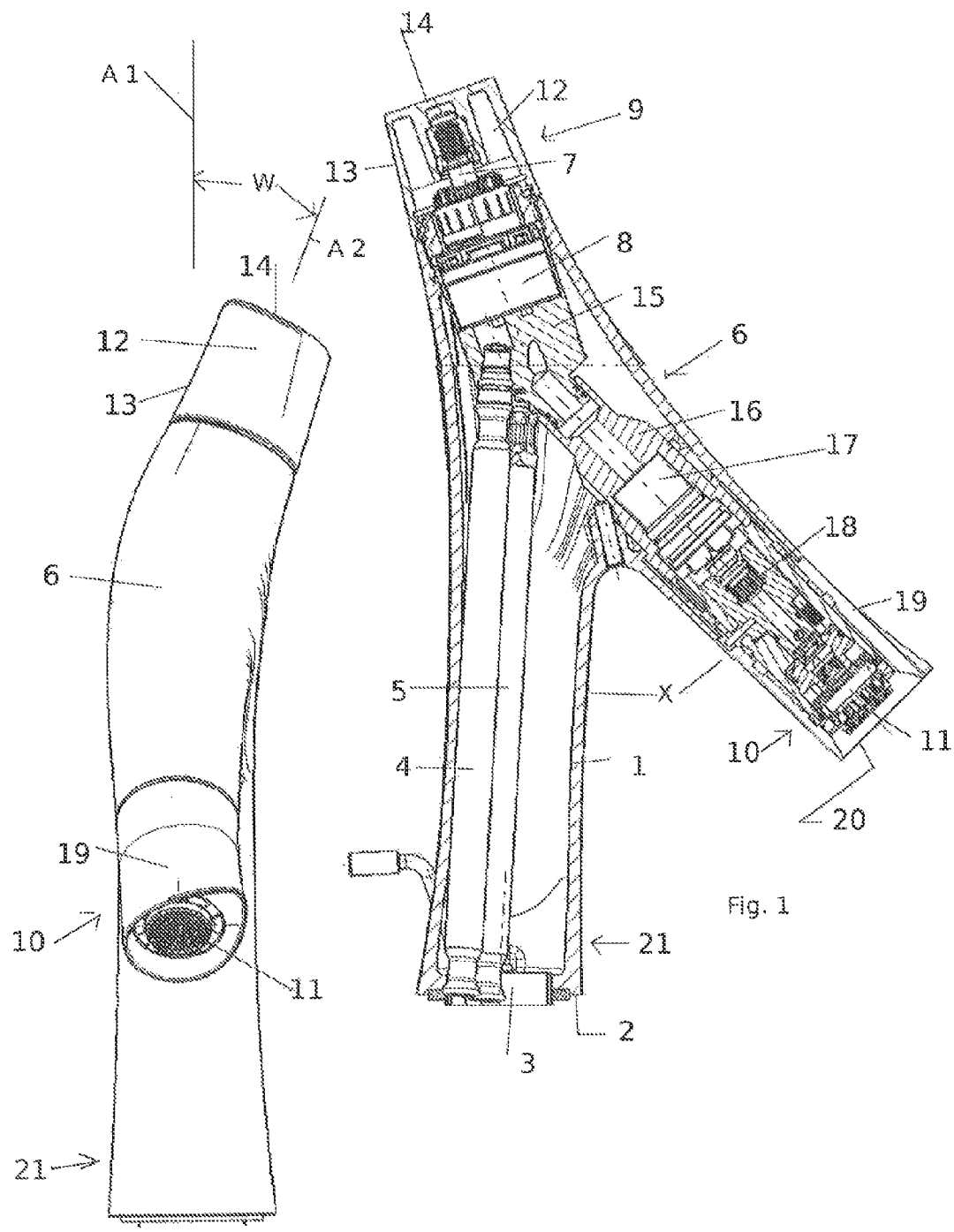
FIG. 1 shows a longitudinal section through a first embodiment of a sanitary fitting proposed by the invention.
FIG. 2 shows a side view of the sanitary fitting from the right in FIG. 1.

The sanitary fitting illustrated in section in FIG. 1 is a washbasin fitting, which is mounted on the top side of a washbasin or washstand. In order to fasten the sanitary fitting, use is made of a fastening attachment 1, which is formed in a tubular manner. Its lower end face 2 represents a fastening end. By way of this end face 2, it is placed on a horizontal surface and fastened there, specifically with the aid of a sleeve 3, which is fitted through a hole in the washbasin and is braced from the underside by way of a threaded ring. Supply lines 4, 5 for hot and cold water lead through this sleeve 3.

The fastening attachment 1 merges into an outlet body 6, which is likewise formed in a tubular manner. The outlet body 6, which extends in a slightly curved manner, has, at its upper end in FIG. 1, an actuating element 7 for a mixer cartridge 8. This upper end 9 is the end opposite the fastening end of the fastening attachment 1. It is simultaneously one end of the tubular outlet body 6. An outlet end 10 is formed at that end of the outlet body 6 which is remote from the actuating end 9.

An outlet 11 is formed at the end side in the outlet end 10 of the outlet body 6. This outlet 11 can be pivoted to a certain extent, so that as a result the spray angle of the outlet 11 can be altered.

The actuating element 7 projects out of the mixer cartridge 8, specifically out of the end side of the actuating end 9 of the outlet body 6. Placed on the actuating element 7, which is in the form of a rotary shank, is a grip in the form of a cap 12, the outer side 13 of which merges in a flush manner into the outer side of the outlet body 6. The end-side termination of the cap 12 is a planar terminating surface 14.

The mixer cartridge 8 is accommodated in a receptacle, the bottom 15 of which has a plurality of channels. The two supply lines 4, 5 open into this bottom 15 and are connected there to the corresponding channels. On account of the only small deviation of the actuating end 9 of the outlet body 6 from the axis of the fastening attachment, the supply lines do not need to be curved or need to be curved only very little.

Out of the bottom 15, a channel leads into a further receptacle 16 for a shut-off valve 17 likewise in the form of a cartridge. The cartridge contains an actuating element 18 which can be rotated with the aid of a sleeve 19. The sleeve 19 forms the actuating element for the cartridge 17. The sleeve 19 has a free end edge 20, which extends further than the outlet 11. As a result, the outlet 11 from the sanitary fitting is arranged in a recessed manner in the outlet end with respect to the sleeve 19. The sleeve 19 can be formed in a shorter manner at one location, see FIG. 2.

Both the fastening attachment 1 and the outlet body 6 are formed in a slightly curved manner. As a result, the axes of the actuating end 9 and of the outlet end 10 are not located in mutual extension but deviate from one another by an angle in the range from about 15° to about 20°. The same also applies for the axes of the actuating end 9 and of the fastening end 21, facing the end face 2, of the fastening attachment 1.

The fastening attachment 1 and the outlet end 10 of the outlet body 6 enclose an angle of about 30° to about 45° between one another. Therefore, in the case of the embodiment illustrated in FIG. 1 and FIG. 2, it can be stated that the actuating end 9 is arranged opposite both the fastening end 21 and the outlet end 10. An organic, slim form of the sanitary fitting is created.

Figure 3:
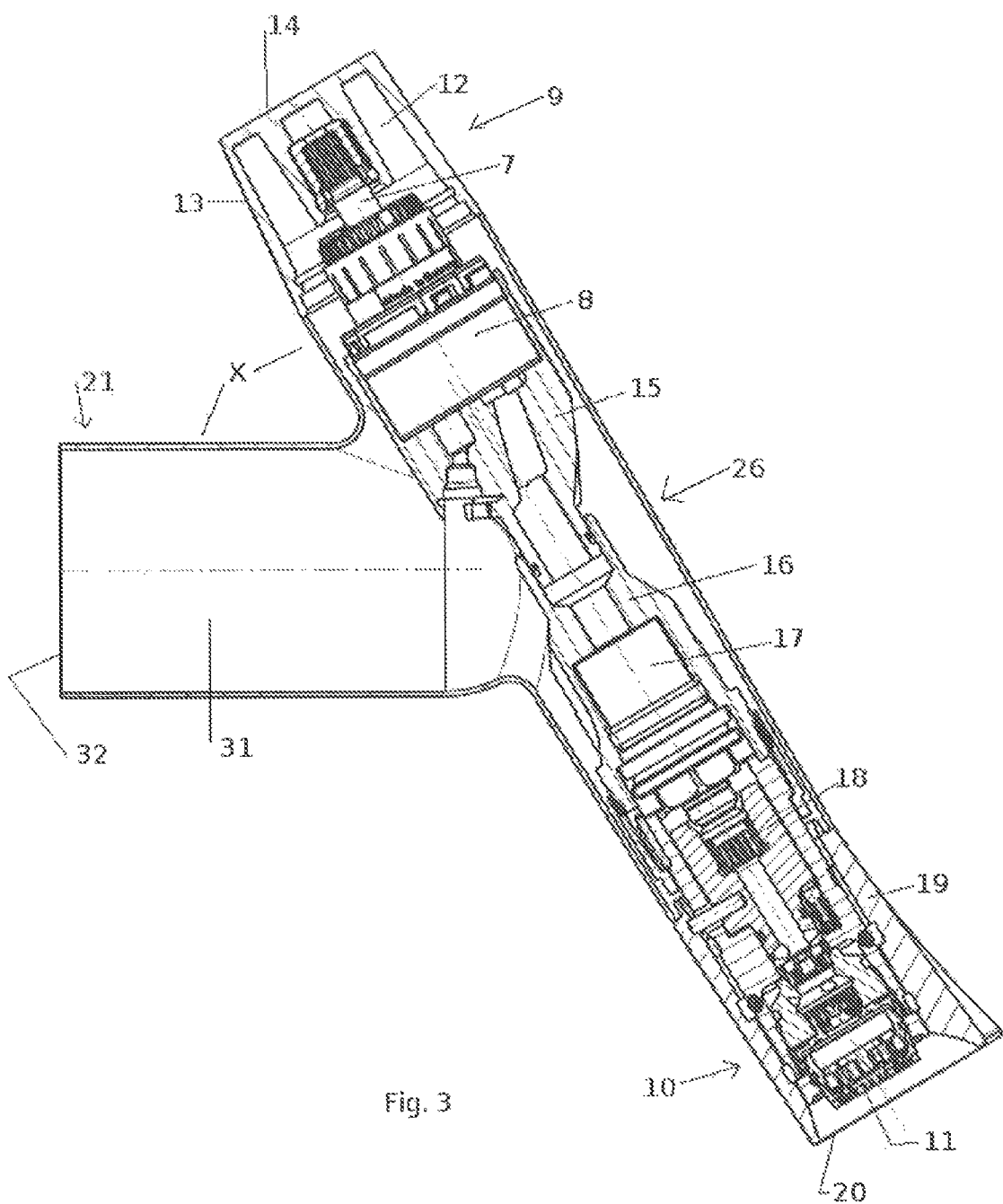
FIG. 3 shows an illustration corresponding to FIG. 2 through a second embodiment of a sanitary fitting.

Now to the second embodiment illustrated in FIG. 3.

The embodiment illustrated here of the sanitary fitting is intended to be fastened to a vertically extending wall. The outlet body 26 extends in this case in a straight line but is otherwise constructed in the same way as the outlet body 6 in the embodiment in FIGS. 1 and 2. Whereas in the embodiment according to FIGS. 1 and 2 the fastening attachment 1 encloses an acute angle with the outlet end 10, here the fastening attachment 31 encloses an acute angle of approximately the same magnitude with the actuating end 9 of the outlet body 26 and accordingly the end face 32 of the fastening attachment 31 is oriented vertically in the mounted state. The supply lines, which are not illustrated, lead through the hollow fastening attachment 31 and are then connected by way of appropriate adapters to the channels in the bottom 15 of the receptacle for the mixer cartridge 8.

In this embodiment, too, there is created a slim sanitary fitting which has no disruptive protrusions and in which the diameter of the tubular outlet body 26 needs to be just large enough for the two cartridges 8, 17 to be able to be accommodated in it.

Figure 4:
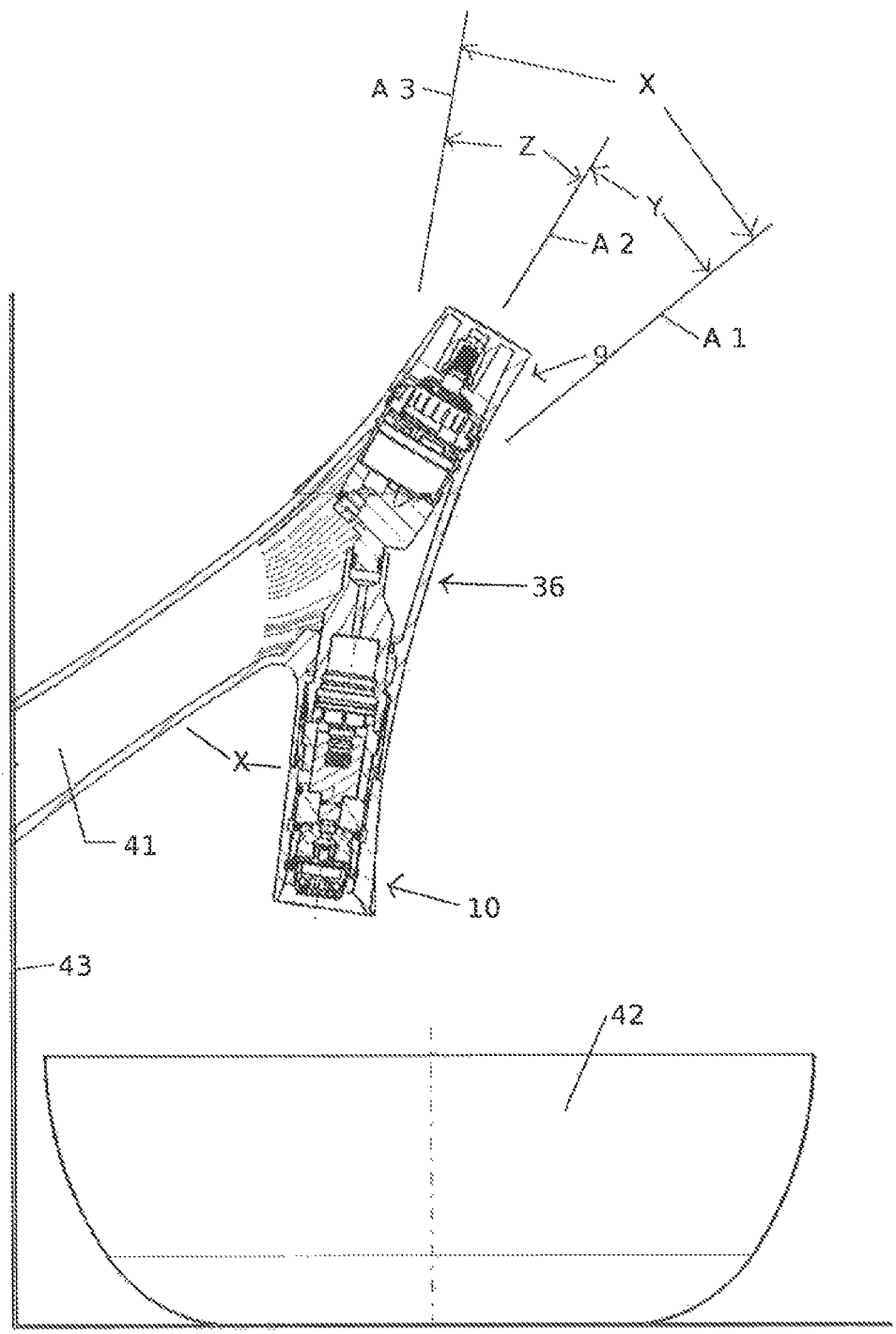
FIG. 4 shows an illustration corresponding to FIG. 1 of yet another embodiment of a sanitary fitting.

FIG. 4 shows a further embodiment, in which both the outlet body 36 and the fastening attachment 41 are constructed in a similar manner to the embodiment according to FIGS. 1 and 2. However, the fastening attachment 41 has been cut off obliquely at its fastening end so that this embodiment is suitable for attachment to a vertically extending wall 43. The angle X between the fastening attachment 41 and the outlet body 36 is approximately the same as in the embodiment according to FIG. 1. Since the internal structure both of the outlet body 36 and of the valve devices contained therein and their actuating elements has not changed compared with the embodiment according to FIG. 2, a description will not be repeated.

In the embodiment according to FIG. 4, too, the outlet body 36 is located in a vertical plane, or in other words its centre axis is located in a vertical plane. It can also deviate slightly from this vertical plane. The outlet itself is directed downwardly into the washbasin 42.

In the embodiment according to FIGS. 1 and 2 and in the embodiment according to FIG. 4, the curvature of the outlet body has been selected such that the concave side points towards the user. By contrast, the curvature of the fastening attachment is such that the concave side points away from the user.

The curvature can also be reversed, that is to say the concave side of the outlet body in the direction towards the wall and the concave side of the fastening attachment in the direction towards the user. Any desired combinations of these types of curvature are within the scope of the invention in all embodiments.

By way of the illustration in FIG. 4, the angles between the individual axes are explained, wherein this explanation also applies for the embodiment according to FIG. 1 and FIG. 2. The axis of the fastening end of the fastening attachment is designated A1. The axis of the outlet end 10 of the outlet body 36 is designated A3. The axis of the actuating end 9 of the outlet body 36 is designated A2.

In the example illustrated, it has been assumed, for the sake of simplicity, that all axes are located on one plane, in this case a vertical plane.

The angle Z between the axis A2 of the actuating end of the outlet body 36 and the axis A3 of the outlet end 10 of the outlet body 36 is about 15° in the example illustrated. It can assume a maximum value of 45°, but the magnitude illustrated is the preferred magnitude.

The angle Y between the axis A2 of the actuating end of the outlet body 36 and the axis A1 of the fastening end of the fastening attachment 41 is likewise in the region of 15° in the embodiment illustrated. It, too, can assume a larger value.

As a result, the angle X between the axis A1 of the fastening end and the axis A3 of the outlet end 10 is acute, about 30° in the example illustrated.

In the explanation of the embodiment in FIG. 4, it was assumed, for the sake of simplicity, that the mentioned axes are located in one plane. However, there may be deviations from this plane. To this end, reference is made once again to FIG. 2. There, the axis A1 of the fastening end of the stand pipe is indicated, and likewise the axis A2 of the actuating end of the outlet body 6. In this front view, the two axes deviate likewise by an angle of about 15°. However, the deviation of these two axes in the front view can likewise be greater, up to almost 90°.

We claim:

1. A device, comprising;
a sanitary fitting having a tubular outlet body having, at a face side of an outlet end, an outlet out of the sanitary fitting and an actuating element for a first valve device of the sanitary fitting, and the outlet body having at a face side of an actuating end opposite from the outlet end, an actuating element for a further valve device of the sanitary fitting, and
a tubular fastening attachment for fastening the sanitary fitting, said fastening attachment merging into the outlet body between the outlet end and the actuating end of the outlet body, said fastening attachment having a fastening end at an end remote from the outlet body, and having supply lines for the sanitary fitting leading through said fastening attachment.

2. The device according to claim 1, wherein the fastening attachment forms a stand pipe.

3. The device according to claim 1, wherein the fastening end is formed at an end of the fastening attachment that is opposite from the actuating end of the outlet body.

4. The device according to claim 1, wherein the fastening end is formed at an end of the fastening attachment that is opposite from the outlet end of the outlet body.

5. The device according to claim 1, wherein the fastening attachment and the outlet body enclose an acute angle between one another.

6. The device according to claim 1, wherein at least one of the outlet body and the fastening attachment is rectilinear.

7. The device according to claim 1, wherein at least one of the outlet body and the fastening attachment is curved.

8. The device according to claim 1, wherein an axis of the fastening end deviates from an axis of an opposite end of the outlet body by at most 45°.

9. The device according to claim 1, wherein an axis of the actuating end of the outlet body deviates from an axis of the outlet end of the outlet body by at most 45°.

10. The device according to claim 1, wherein the actuating element has a rotatable cap at the actuating end of the outlet body, an outer side of said rotatable cap being formed as an approximate continuation of the outlet body.

11. The device according to claim 10, wherein the cap has a planar end face that extends transversely to a longitudinal axis of the outlet body.

12. The device according to claim 1, wherein the actuating element has a rotatable sleeve at the outlet end of the outlet body.

13. The device according to claim 12, wherein the sleeve surrounds the outlet.

14. The device according to claim 12, wherein the outer side of said rotatable sleeve is formed as an approximate continuation of the outlet body.

15. The device according to claim 1, wherein said further valve device actuated by the actuating element at the actuating end of the outlet body accomplishes a temperature setting.

16. The device according to claim 1, wherein said first valve device actuated by the actuating element at the outlet end of the outlet body accomplishes a volume regulation.

17. The device according to claim 1 further comprising inlet pipes that open into the outlet body between two valve devices actuated by the actuating element at the outlet end of the outlet body.

18. The device according to claim 1, wherein a central axis of the outlet body is located at least approximately in a vertical plane when the sanitary fitting is fitted in place.

19. The device according to claim 1, wherein a spray angle of the outlet is alterable and settable.

20. The device according to claim 1, wherein an axis of the fastening end deviates from an axis of an opposite end of the outlet body by at most 15°.

21. The device according to claim 1, wherein an axis of the actuating end of the outlet body deviates from an axis of the outlet end of the outlet body by at most 15°.

* * * * *